United States Patent
Martin et al.

(10) Patent No.: US 10,805,867 B2
(45) Date of Patent: Oct. 13, 2020

(54) ESTABLISHING LWA-WLAN COMMUNICATION

(71) Applicant: Ruckus Wireless, Inc., Sunnyvale, CA (US)

(72) Inventors: Steve A. Martin, San Jose, CA (US); David A. Wright, Durham, NC (US); David Sheldon Stephenson, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/750,505

(22) PCT Filed: Nov. 16, 2015

(86) PCT No.: PCT/US2015/060937
§ 371 (c)(1),
(2) Date: Feb. 6, 2018

(87) PCT Pub. No.: WO2017/023349
PCT Pub. Date: Feb. 9, 2017

(65) Prior Publication Data
US 2018/0227835 A1    Aug. 9, 2018

Related U.S. Application Data (60) Provisional application No. 62/201,843, filed on Aug. 6, 2015.

(51) Int. Cl.
*H04W 48/14* (2009.01)
*H04W 28/08* (2009.01)
(Continued)

(52) U.S. Cl.
CPC ........... *H04W 48/14* (2013.01); *H04W 28/08* (2013.01); *H04W 48/16* (2013.01); *H04W 84/12* (2013.01); *H04W 88/10* (2013.01); *H04W 92/20* (2013.01)

(58) Field of Classification Search
None
See application file for complete search history.

(56) References Cited

U.S. PATENT DOCUMENTS

2013/0242965 A1* 9/2013 Horn ..................... H04W 24/10
370/338
2014/0101726 A1* 4/2014 Gupta ................ H04N 21/2365
726/4

(Continued)

FOREIGN PATENT DOCUMENTS

EP    1947889       7/2008
EP    1947889 A2    7/2008

(Continued)

OTHER PUBLICATIONS

Extended European Search Report, Re: Application No. 15900606.3, dated Dec. 12, 2018.

(Continued)

*Primary Examiner* — Rebecca E Song
(74) *Attorney, Agent, or Firm* — Steven Stupp; Stewart Wipner (57) ABSTRACT

A communication technique for establishing communication among an access point, an electronic device, and a radio node in a cellular-telephone network is described. In this communication technique, the electronic device is pre-provisioned by the radio node with an identifier of the cellular-telephone network. Moreover, the access point may advertise support for one or more LWA protocols in beacons. In response to a query from the electronic device, the access point may provide identifiers of the one or more cellular- (Continued)

telephone networks supported by the access point. If one of these identifiers matches the identifier, the electronic device may associate with the access point. Then, the access point may receive LWA traffic from the radio node and may forward the LWA traffic to the electronic device.

20 Claims, 7 Drawing Sheets

(51) Int. Cl.
*H04W 48/16* (2009.01)
*H04W 92/20* (2009.01)
*H04W 88/10* (2009.01)
*H04W 84/12* (2009.01)

(56) References Cited

U.S. PATENT DOCUMENTS

| | | | |
|---|---|---|---|
| 2014/0293780 A1 | 10/2014 | Faccin et al. | H04W 12/06 |
| 2014/0307550 A1* | 10/2014 | Forssell | H04W 36/22 370/235 |
| 2016/0219463 A1* | 7/2016 | Mestanov | H04W 28/08 |
| 2016/0338102 A1* | 11/2016 | Nuggehalli | H04W 72/10 |
| 2018/0227752 A1* | 8/2018 | Teyeb | H04W 12/04 |

FOREIGN PATENT DOCUMENTS

| | | | | |
|---|---|---|---|---|
| WO | WO 2015-042189 | 3/2015 | | H04W 48/10 |
| WO | WO 2015-088264 | 6/2015 | | H04W 74/08 |
| WO | WO 2015-108462 | 7/2015 | | H04W 48/18 |

OTHER PUBLICATIONS

Mediatek Inc: "WLAN Authentication for LTE-WLAN Aggregation", 3GPP Draft; 3rd Generation Partnership Project (3GPP), May 24, 2015.
Hotspot 2.0 Technical Task Group Wi-Fi Alliance: "Wi-Fi Certified Passpoint (TM) (Release 1) Deployment Guidelines", Oct. 31, 2012.
Ericsson: "LTE-WLAN Aggregation", 3GPP Draft, 3rd Generation Partnership Project (3GPP), Apr. 11, 2015.
Nokia Networks, "3C user-plane architecture for LTE-WLAN aggregation," R2-152105, 3GPP TSG-RAN WG2 Meeting #90, Fukuoka, Japan, May 15, 2015.
International Search Report and Written Opinion, PCT/US2015/060937, dated Jun. 24, 2016.
Ericsson, "LTE-WLAN Aggregation," R3-150737, 3GPP TSG-RAN WG3 #87bis, Apr. 20-24, 2015.
Wi-Fi Alliance Hotspot 2.0 Technical Task Group, Wi-Fi Certified Passpoint (Release 1) Version 1.0, Oct. 2012. Deployment Guidelines, Version 1.0, Oct. 2012.
MediaTek, Inc., "Wlan Authentication for LTE-WLAN Aggregation," R2-152123, 3GPP TSGRAN WG2 #90, May 29, 2015.
European Patent Application 15900606.3, Extended European Search Report, dated Dec. 12, 2018.
European Patent Application 15900606.3, Response to Extended European Search Report, dated Jul. 12, 2019.
European Patent Application 15900606.3, First Examination Report, dated Oct. 30, 2019.
European Patent Application 15900606.3, Response to First Examination 2020 Report, dated Mar. 6, 2020.

* cited by examiner

ESTABLISHING LWA-WLAN COMMUNICATION

CROSS REFERENCE TO RELATED APPLICATIONS

This application claims priority under 35 U.S.C. 371 to International Patent Application No. PCT/US15/60937, "Establishing LWA-WLAN Communication," by Steven A. Martin, David A. Wright and David Sheldon Stephenson, filed on Nov. 16, 2015, which claims priority to U.S. Provisional Patent Application No. 62/201,843, "Establishing LWA-WLAN Communication," by Steven A. Martin, David A. Wright and David Sheldon Stephenson, filed on Aug. 6, 2015, the contents of both of which are herein incorporated by reference.

BACKGROUND

Field

The described embodiments relate to techniques for communicating information among electronic devices, including communicating data information from a cellular-telephone network via a wireless local area network.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

While many electronic devices communicate with each other via large networks owned by a network operator, it is often difficult to communicate via a cellular-telephone network, e.g., in high density or crowded environments. In particular, in crowded environments the network performance (such as the block error rate and the capacity) of the cellular-telephone network can be degraded. Moreover, there are often constraints on the number of cellular-telephone towers. Consequently, it can be difficult for the operator of the cellular-telephone network to improve the quality of their service e.g., in crowded environments.

SUMMARY

The described embodiments relate to an access point that establishes communication with an electronic device and a radio node (such as an eNode-B) in a cellular-telephone network. This access point includes: an antenna connector (which may be connected to an antenna), and an interface circuit that communicates with the electronic device, the radio node, and a server associated with the cellular-telephone network. During operation, the access point advertises support for a communication protocol in beacons. Then, the access point receives, from the electronic device, a query for identifiers of one or more cellular-telephone networks that provide communication via a Long Term Evolution (LTE) Wi-Fi aggregation (LWA) protocol, and which are supported by the access point. In response, the access point provides, to the electronic device, the identifiers of the one or more cellular-telephone networks. Next, the access point receives, from the electronic device, an association request, and the access point associates with the electronic device.

Note that the communication protocol may include a Hotspot 2.0 protocol. Moreover, the identifiers of the cellular telephone networks may include public land mobile network (PLMN) identifiers. Furthermore, the query may be compatible with an access network query protocol (ANQP).

Moreover, the access point may receive, from the electronic device, an authentication request with credentials of the electronic device with the cellular-telephone network, which the access point forwards to the server. Furthermore, the access point may receive, from the server, an acceptance message that includes information used to generate encryption keys for an IEEE 802.11 session between the access point and the electronic device. Additionally, the access point may communicate the authentication request with the server via a remote authentication dial-in user service (RADIUS) protocol. Note that the access point may provide the information to the electronic device and/or may use the information to generate an encryption key for use by the access point during the IEEE 802.11 session.

In some embodiments, the access point advertises support for the communication protocol in probe responses.

Furthermore, the access point may assist the radio node in performing load or traffic balancing with the electronic device. In particular, the access point may receive, from the radio node, LTE packet data convergence protocol (PDCP) datagrams that are encapsulated into IEEE 802.11 media access control (MAC) frames. Then, the access point may communicate the IEEE 802.11 MAC frames to the electronic device.

Another embodiment provides the radio node.

Another embodiment provides the electronic device. This electronic device may store in memory an identifier of the cellular-telephone network that the electronic device compares to the identifiers of the one or more cellular-telephone networks received from the access point. If there is a match between the stored identifier and the one or more identifiers received from the access point, the electronic device may provide the association request. Note that the stored identifier may have been previously provided to the electronic device by the radio node when the electronic device registered with the radio node for a service with the cellular-telephone network, such as LTE.

Another embodiment provides a wireless local area network (WLAN) controller, which may perform at least some of the operations performed by the access point.

Another embodiment provides a computer-program product for use with the access point, the electronic device, the radio node and/or the WLAN controller. This computer-program product includes instructions for at least some of the operations performed by the access point, the electronic device, the radio node and/or the WLAN controller.

Another embodiment provides a method. This method includes at least some of the operations performed by the access point, the electronic device, the radio node and/or the WLAN controller.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Table 1 provides an example of the performance feedback that is communicated between the access point and the radio node in FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

A communication technique for establishing communication among an access point, an electronic device, and a radio node (such as an eNode-B) in a cellular-telephone network is described. In this communication technique, the electronic device is provisioned by the radio node with an identifier of the cellular-telephone network when the electronic device registers for a service provided by the cellular-telephone network (such as Long Term Evolution or LTE). Moreover, the access point may advertise support for one or more LTE Wi-Fi aggregation (LWA) protocols in beacons. In response to a query from the electronic device, the access point may provide identifiers of the one or more cellular-telephone networks supported by the access point. If one of these identifiers matches the identifier, the electronic device may associate with the access point. Then, via the access point, the electronic device may authenticate with a server associated with the cellular-telephone network by providing credentials of the electronic device with the cellular-telephone network. If the credentials are authenticated, the server may provide information used to generate dynamic encryption keys for an IEEE 802.11 session between the access point and the electronic device. Subsequently, in conjunction with the radio node, the access point may perform load or traffic balancing with the electronic device via the one or more LWA protocols.

The communication technique may provide a more secure approach for establishing the communication among the access point, the electronic device and the radio node. Moreover, the communication technique may allow the access point to support multiple cellular-telephone networks. Furthermore, the communication technique may leverage existing communication protocols, so the access point, the electronic device and/or the radio node may not need to be modified to implement the communication technique. Consequently, by facilitating improved and more secure communication with the electronic device, the communication technique may increase customer satisfaction and loyalty.

A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the embodiments of the inventions.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density or crowded environments. While the use of femto cells and/or small cells can mitigate this challenge, there are still often circumstances where the network performance and quality of a cellular-telephone network is degraded.

In principle, access points in wireless local area networks (WLANs) offer a potential solution to this challenge. In particular, large numbers of access points are typically available in high density or crowded environments (such as offices), thereby providing available network infrastructure through which a cellular-telephone network can convey or piggyback packets. In practice, this approach poses a variety of additional challenges in terms of scaling (e.g., to large numbers of access points and/or electronic devices), discovery, security, and performance. These challenges are addressed in the communication technique described below.

In the discussion that follows, Long Term Evolution or LTE (from the 3rd Generation Partnership Project of Sophia Antipolis, Valbonne, France) is used as an illustration of a data communication protocol in a cellular-telephone network and IEEE 802.11 (which is sometimes referred to as 'Wi-Fi' from the Wi-Fi Alliance of Austin, Tex.) is used as an illustration of a communication protocol in a WLAN. For example, the communication technique may include protocols for integrating LTE communications over Wi-Fi links such as contemplated in the LTE Wi-Fi aggregation (LWA) protocol being developed. However, a wide variety of communication techniques or protocols may be used. In order to implement the communication technique, note that changes may be needed in: user equipment (such as cellular telephones), access points, and eNode-Bs or eNBs (which are sometimes referred to as 'radio nodes').

Figure 1:
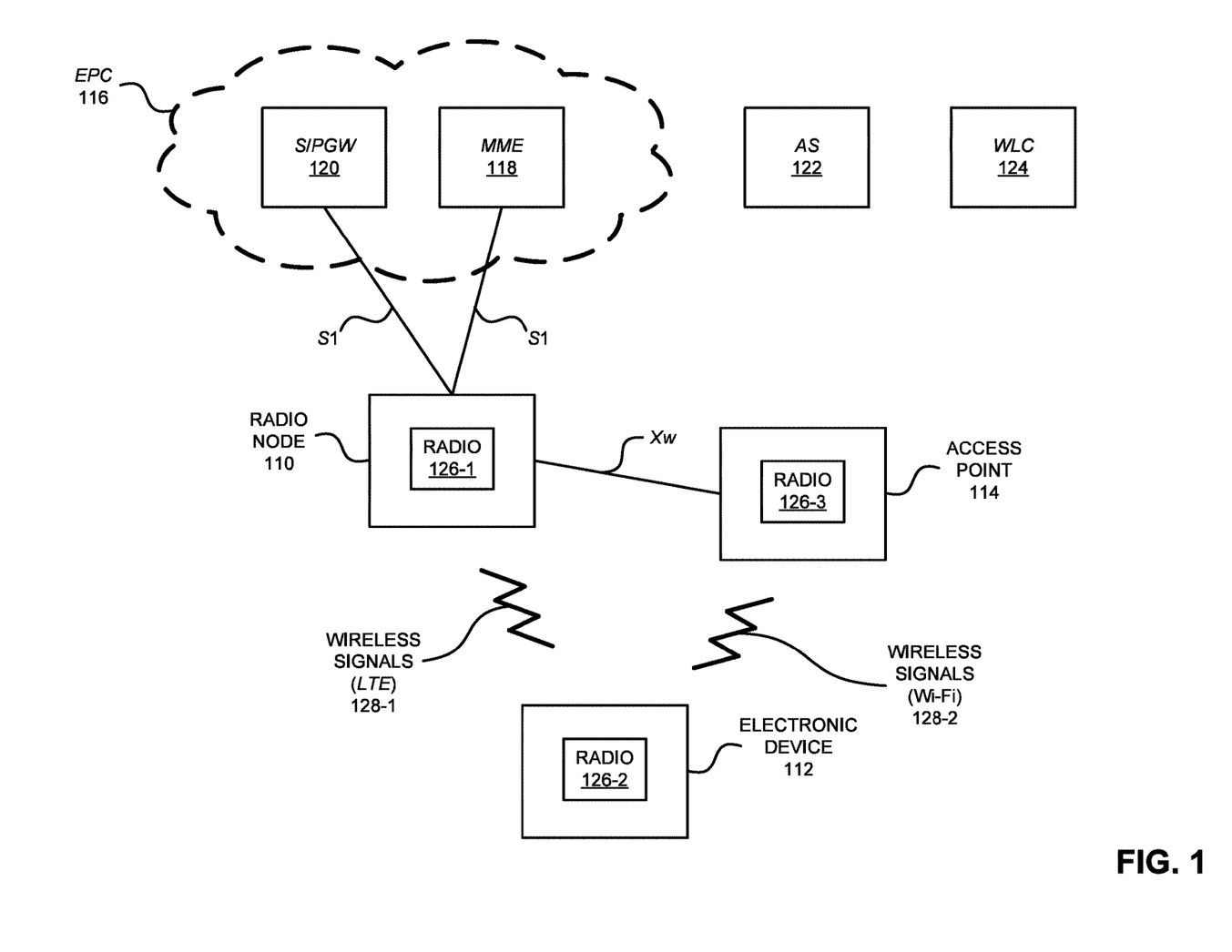
FIG. 1 is a block diagram illustrating electronic devices wirelessly communicating in accordance with an embodiment of the present disclosure.

FIG. 1 presents a block diagram illustrating wireless communication among electronic devices according to some embodiments. In particular, radio node 110 can communicate LTE data frames or packets using LTE with an electronic device 112 (which is sometimes referred to as 'user equipment' or UE, such as a cellular telephone and, more generally, a portable electronic device). Based on performance feedback (such as feedback about the LTE and/or Wi-Fi link quality, a quality of service and/or one or more performance metrics, e.g., the network capacity, the network state, etc.), radio node 110 may also communicate (via wireless or wired communication) LTE data frames or packets to an access point 114 (AP) via an interface, such as an Xw interface (and, more generally, an interface that is similar to X2 or a general packet radio service tunneling protocol, such as GTP-U) that encapsulates the LTE packet data convergence protocol (PDCP) datagrams into IEEE 802.11 media access control (MAC) frames. (Although described in the context of Xw, other or future interfaces could be used, i.e., another interface or protocol for communicating between radio node 110 and access point 114.) For example, the tunnel between radio node 110 and access point 114 may strip the headers off the LTE PDCP datagrams, which may then be included in the IEEE 802.11 MAC frames. (More generally, a tunnel may take data in one protocol, encapsulate it and place it into another protocol.)

Then, access point 114 may communicate these IEEE 802.11 frames or packets to electronic device 112 (which supports dual connectivity and packet data convergence protocol aggregation) using Wi-Fi. Next, electronic device 112 may aggregate or re-concatenate the two sources of data frames or packets (i.e., from radio node 110 and access point 114) back into an LTE data stream with LTE PDCP datagrams. (Alternatively, in other embodiments communication protocols such as Bluetooth and/or an Internet-of-Things communication protocol are used.) Note that the communication of data between radio node 110 and access point 114, and then from access point 114 to electronic device 112 may be unidirectional or bidirectional.

However, this approach poses some challenges. In particular, it may be difficult for radio node 110 to discover access point 114 and/or to provide security. For example, many current proposals for LWA-WLAN discovery and selection are based upon the provisioning of a static WLAN service set identifier (SSID) to electronic device 112 by radio node 110 during the LTE registration process. The Wi-Fi connection manager on electronic device 112 may then look for Wi-Fi access points including this SSID in their beacon and/or probe response frames. Once electronic device 112 detects the provisioned SSID in a beacon or a probe response, it may proceed to associate with and attempt to authenticate to that WLAN.

Moreover, many current proposals LWA-WLAN authentication and encryption are based on one of two approaches. A first proposed approach uses IEEE 802.1x authentication with an extensible authentication protocol (such as EAP-SIM, EAP-AKA and/or EAP-AKA'), in which a credential with a cellular-telephone network (which is sometimes referred to as a 'cellular credential') of electronic device 112 (such as a subscriber identity module or SIM, or a universal subscriber identity module or USIM) is used to authenticate the session back to the LWA home network operator's or cellular-telephone carrier's home subscriber server (HSS) or home location register (HLR) via a remote authentication dial-in user service (RADIUS) protocol or messaging. Alternatively, in a second proposed approach, a dynamic pre-shared key (dPSK) is provisioned to electronic device 112 by radio node 110 during the LTE registration process, and this dPSK is then used for Wi-Fi protected access-2 (WPA-2) personal authentication and encryption.

However, the proposal to use a static SSID for LWA-WLAN discovery and selection and/or the proposal to use a dPSK for LWA-WLAN authentication and encryption are not consistent with the latest advances in carrier and enterprise WLAN systems. Moreover, dPSK (even with an eNB key or KeNB derivation) may be open to relatively easy abuse and disruption.

In order to address these problems, a communication technique may use an access network query protocol (ANQP) information element in an IEEE 802.11u/Hotspot 2.0 communication protocol (from the Wi-Fi Alliance of Austin, Tex.) to perform the LWA-WLAN discovery and selection. In the discussion that follows, the information element is referred to as an 'LWA_PLMN' element, where PLMN refers to a public land mobile network that identifies a cellular-telephone network. (Thus, the LWA_PLMN may be an identifier of the cellular-telephone network.) Note that Hotspot 2.0, release 2, provides enhanced security via robust authentication and encryption, including the use of a public key infrastructure (PKI) to validate the Wi-Fi infrastructure components.

Figure 2:
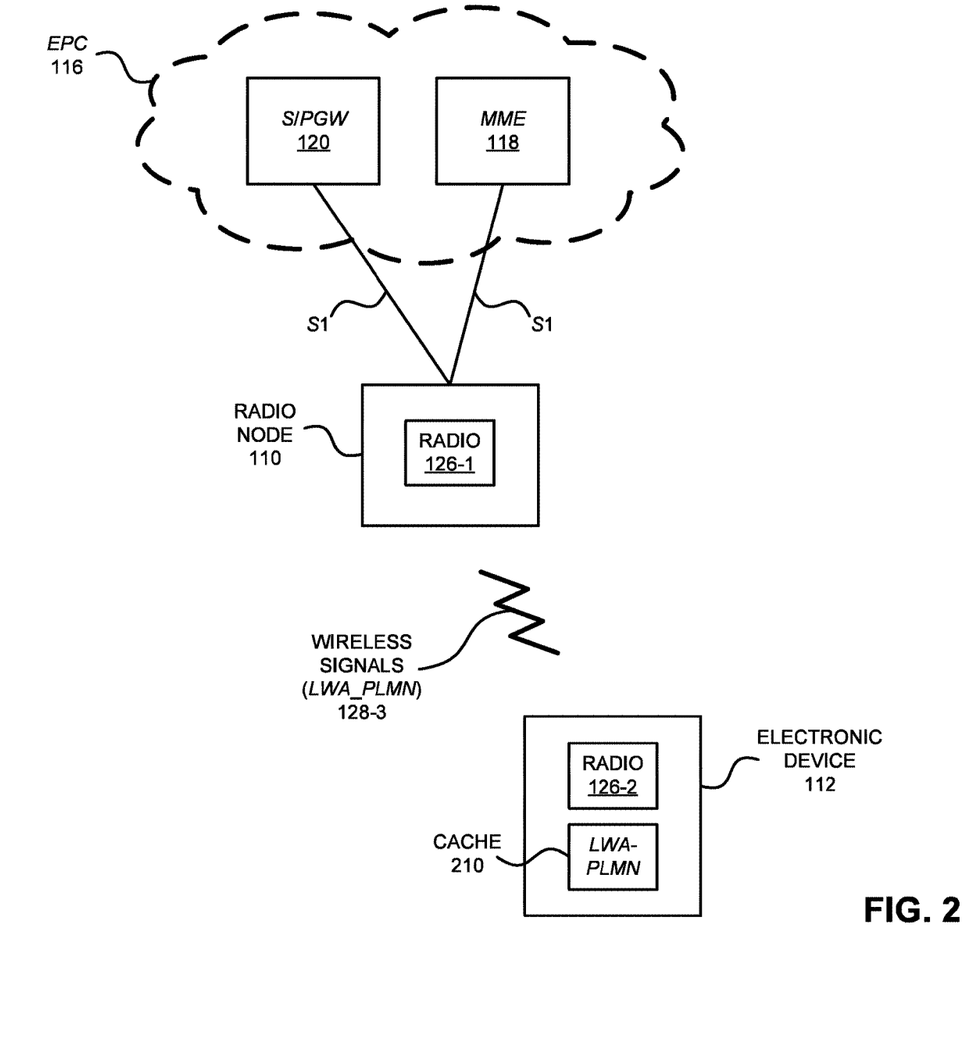
FIG. 2 is a block diagram illustrating Long Term Evolution Wi-Fi aggregation (LWA) registration and provisioning between the radio node and the electronic device in FIG. 1 in accordance with an embodiment of the present disclosure.

As described further below with reference to FIG. 2, the LWA_PLMN element may be provisioned to electronic device 112 by radio node 110 during the LTE registration process. The LWA_PLMN element may also be provisioned on the Wi-Fi infrastructure(s) that will be used for LWA services (in lieu of defining a new static SSID), such as access point 114 (FIG. 1). Then, as described further below with reference to FIG. 3, when electronic device 112 comes in range of access point 114 advertising support for a communication protocol (such as Hotspot 2.0) in its beacon and/or probe response frames, electronic device 112 may formulate an ANQP query (either directed or general) in order to ascertain whether access point 114 supports LWA services for the home network operator or the carrier of the cellular-telephone network of electronic device 112. (However, a different communication protocol than ANQP may be used to provide the query.)

Figure 4:
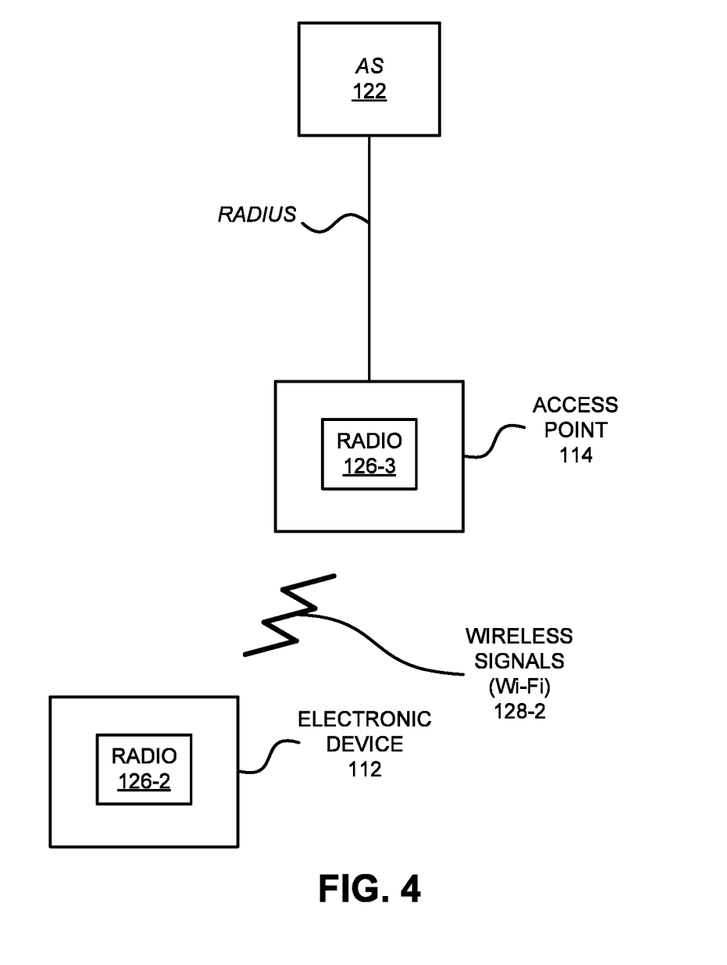
FIG. 4 is a block diagram illustrating LWA-WLAN authentication and encryption among the electronic devices in FIG. 1 in accordance with an embodiment of the present disclosure.

As described further below with reference to FIG. 4, in response to the ANQP query, access point 114 may communicate with authentication server 122 (such as a home subscriber server or HSS, or home location register or HLR) via RADIUS messaging to authenticate electronic device 112. In particular, if there is a match between the LWA_PLMN element provisioned to electronic device 112, and the LWA_PLMN element provisioned to, and being advertised by, access point 114, electronic device 112 may associate with access point 114 and may authenticate using EAP-SIM, EAP-AKA and/or EAP-AKA' depending upon the type of cellular credential it possesses.

This communication technique may be more secure than the existing proposals. In particular, dPSK may require that the Wi-Fi infrastructure play an active role in authenticating electronic device 112 to access point 114. For example, the dPSK value may need to be configured on the Wi-Fi infrastructure. In contrast, with IEEE 802.11x and EAP-SIM, EAP-AKA and/or EAP-AKA' the Wi-Fi infrastructure plays a passive role in authenticating electronic device 112 to access point 114. (As described further below, the mobile network operator authentication, authorization and accounting and the HLR/HSS may perform the actual authentication.) Thus, the IEEE 802.1x approach used in the communication technique may be more secure. Moreover, Wi-Fi radio access network partners can use existing Hotspot 2.0 WLANs, which can be enabled for LWA operation by advertising the LWA_PLMN(s) elements via ANQP. Furthermore, a single Hotspot 2.0 access point can support multiple LWA LTE partners, such as different cellular-telephone networks.

We now further describe the communication technique. FIG. 2 presents a block diagram illustrating LWA registration and provisioning between radio node 110 and electronic device 112 according to some embodiments. In particular, radio node 110 may communicate with an evolved packet core (EPC) 116 using an S1 interface to mobile management entity (MME) 118 and/or serving gateway/packet data network gateway (S/PGW) 120. (Although described in the context of S1, other or future interfaces could be used, i.e., an interface or protocol for communicating between radio node 110 and mobile management entity 118 and/or serving gateway/packet data network gateway 120.) Moreover, during the LTE registration, radio node 110 may provision the LWA_PLMN element value of a cellular-telephone network to electronic device 112. For example, the LWA_PLMN element value may be conveyed by wireless signals 128-3. Moreover, electronic device 112 may store the LWA_PLMN element for subsequent use in Hotspot 2.0 discovery and selection. For example, the LWA_PLMN element may be stored in a Wi-Fi connection manager, such as in cache 210.

Figure 3:
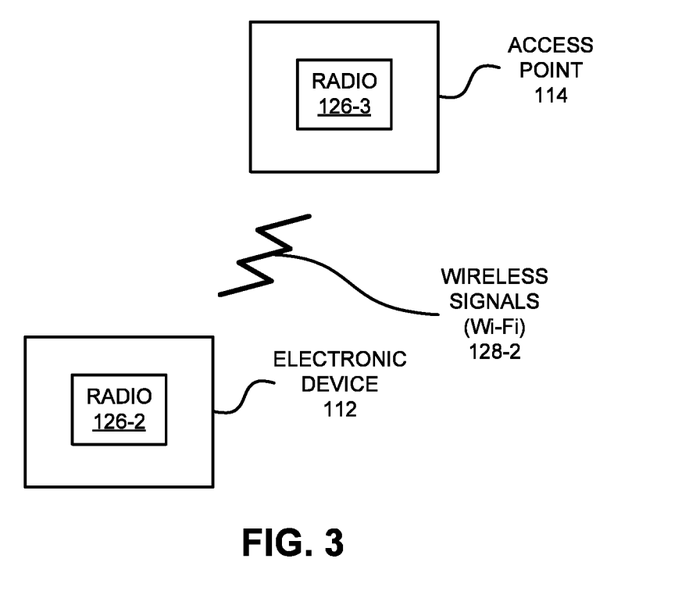
FIG. 3 is a block diagram illustrating LWA-wireless local area network (WLAN) discovery and selection between the access point and the electronic device in FIG. 1 in accordance with an embodiment of the present disclosure.

As shown in FIG. 3, which presents a block diagram illustrating LWA-WLAN discovery and selection between access point 114 and electronic device 112 according to some embodiments, in order to facilitate discovery of access point 114 by electronic device 112, the beacons broadcast by access point 114 and/or probe responses provided by access point 114 may include or advertise support for a communication protocol, such as Hotspot 2.0 and/or one or more LWA protocols (e.g., by including an LWA-capability indicator in the beacons and/or the probe responses). In response, electronic device 112 may send an ANQP query for the LWA_PLMN element(s) supported on access point 114. Then, access point 114 may send, via ANQP, a capability list with the supported LWA_PLMN element(s).

Electronic device 112 may compare its cached LWA_PLMN element value(s) from the LTE provisioning process with the LWA_PLMN element(s) returned by access point 114. If there is a match between the LWA_PLMN element values, electronic device 112 may associate with access point 114. Alternatively, if the LWA_PLMN element values do not match, electronic device 112 may not associate.

In some embodiments, in order to facilitate discovery of access point 114 by electronic device 112, the beacons broadcast by access point 114 may include an LWA-capability indicator and/or a list of the LWA_PLMN element(s) for one or more cellular-telephone networks (such as PLMN x) supported by access point 114. This information may allow electronic device 112 to determine that a cellular-telephone network associated with carrier or network x is supported by access point 114 (i.e., it is an LWA-capable Wi-Fi network) without requiring electronic device 112 to provide the ANQP query.

In addition to cellular-telephone networks, the LWA_PLMN elements may be used to indicate that access point 114 supports services or capabilities via one or more networks that are different than cellular-telephone networks associated with cellular-telephone carriers. In particular, one or more of the LWA_PLMN elements may be used to advertise a small-cell network (which is sometimes referred to as an 'LTE neutral-host network') that may be hosted by an entity (such as a company or an enterprise) that is other than a network operator or a cellular-telephone carrier. For example, such a small-cell network may have a corresponding LWA_PLMN element, which, if it is supported, may be included in the beacons broadcast by access point 114. Alternatively a small-cell network may have multiple associated LWA_PLMN identifiers that indicate networks that it supports.

Note that, by using the communication technique, the dependence on the service set identifier (SSID) of a particular WLAN network may be removed (in general, there may be multiple SSIDs associated with a given access point, such as access point 114). Instead, it may allow support for the one or more cellular-telephone networks to be indicated.

After associating with access point 114, electronic device 112 may attempt to authenticate with the cellular-telephone network. This is shown in FIG. 4, which presents a block diagram illustrating LWA-WLAN authentication and encryption among electronic device 112, access point 114 and authentication server 122 according to some embodiments. In particular, after associating with access point 114, electronic device 112 may attempt to authenticate using IEEE 802.11x using its cellular credential (e.g., via EAP-SIM, EAP-AKA and/or EAP-AKA'). In response to receiving such an authentication message, access point 114 may forward the authentication request to authentication server (AS) 122 using a RADIUS protocol over a wired (such as Ethernet) and/or a wireless connection. Note that authentication server 122 may be the home network operator's HLR/HSS, which may be accessed via a home authentication, authorization and accounting gateway.

Authentication server 122 may perform validation of the cellular credential of electronic device 112. If the authentication is successful, an acceptance or an access-accept message may be returned via RADIUS to access point 114 along with information used to generate dynamic encryption keys for the Wi-Fi session between electronic device 112 and access point 114. In response, access point 114 may provide the information to electronic device 112 and/or may use the information to generate an encryption key for use by access point 114 during the Wi-Fi session. In some embodiments, access point 114 uses the information to generate an encryption key for use by electronic device 112, which access point 114 provides to electronic device 112.

Referring back to FIG. 1, electronic device 112 and/or evolved packet core 118 may communicate information specifying access point 114 to radio node 110. In response, radio node 110 may set up a tunnel with access point 114.

Subsequently, in conjunction with radio node 110, access point 114 may provide traffic or load balancing during LWA communication with electronic device 112. In particular, in order to facilitate the traffic or load balancing during the LWA communication with electronic device 112, radio node 110 may communicate (via wireless or wired communication) control information and data with access point 114 using the Xw interface. For example, the control information may be communicated using GTP-U and the data may be communicated using stream control transmission protocol (SCTP) and Internet protocol (IP). Note that the control messages may signal the binding between the tunnel endpoint identifiers (TEID) and a MAC address of access point 114. This communication may include an identifier of the cellular-telephone network, such as a public land mobile network (PLMN) identifier. For example, radio node 110 may be included in PLMN x, where x can represent a particular network. As noted previously, during the traffic or load balancing, radio node 110 may forward LTE data to access point 114 for communication to electronic device 112 via IEEE 802.11.

Additionally, as noted previously, in order to facilitate transmission scheduling and/or load balancing by radio node 110, electronic device 112 and/or access point 114 may provide performance feedback about the LTE communication and/or the Wi-Fi communication to radio node 110. In particular, electronic device 112 may send measurement reports (and, more generally, performance feedback) to radio node 110 for a current connection with access point 114. In some embodiments, radio node 110 optionally obtains measurement reports (and, more generally, performance feedback) directly from access point 114. Based on the performance feedback, radio node 110 may select a desired target access point (which may no longer be access point 114), and radio node 110 may direct electronic device 112 to associate with this target access point. Note that this capability may be in contrast with the normal approach used in Wi-Fi, in which electronic device 112 decides the access point that it wants to connect to or associate with.

Table 1 presents an exemplary LWA message report format according to some embodiments. Note that if all stations are disassociated, the MAC address is set to broadcast address and the status field is set to disconnect. Moreover, the RSSI may be the moving average of acknowledge-RSSI over the last N-samples because the LWA-WLAN uplink packets may be infrequent. Furthermore, the packet error rate may be defined as the ratio of dropped packets to the number of transmit attempts. Packets that are dropped between the Ethernet interface and ingress into the wireless interface may not be accounted for in the packet error rate. Additionally, the access time may be the time taken to access the channel after the packet has been placed into the hardware queue. This access time may exclude the transmission time of the packet. In some embodiments, the access time is a moving average over a window.

TABLE 1

| Field | Length (Bytes) | Information |
|---|---|---|
| Number of stations | 2 | Number of stations being reported |
| MAC address | 6 | Wi-Fi MAC address of the electronic device |
| Status | 1 | Connected/Disconnected |
| Received signal strength indicator (RSSI) | 1 | −127 to 127 dB |
| Number of wireless mobility management (WMM) reports | 1 | Number of queues being reported for station |
| WMM queue identifier | 1 | 0 = Background, 1 = Best effort, 2 = Video, 3 = Voice |
| Packet error rate | 1 | Ratio of dropped packets to good packets transmitted since last report |
| Queue delay | 2 | Since last report in milliseconds |
| Access time | 2 | Time to gain access to the channel (microseconds) |

In general, the wireless communication in FIG. 1 may be characterized by a variety of performance metrics, such as: a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In some embodiments, at least some of the operations performed by access point 114 in the preceding discussion are performed by an optional WLAN controller (WLC) 124.

During the communication in FIG. 1, radio node 110, electronic device 112 and/or access point 114 may wirelessly communicate while: transmitting advertising frames on wireless channels, detecting one another by scanning wireless channels, establishing connections (for example, by transmitting association requests), and/or transmitting and receiving frames that include packets (which may include the association requests and/or additional information as payloads).

Figure 7:
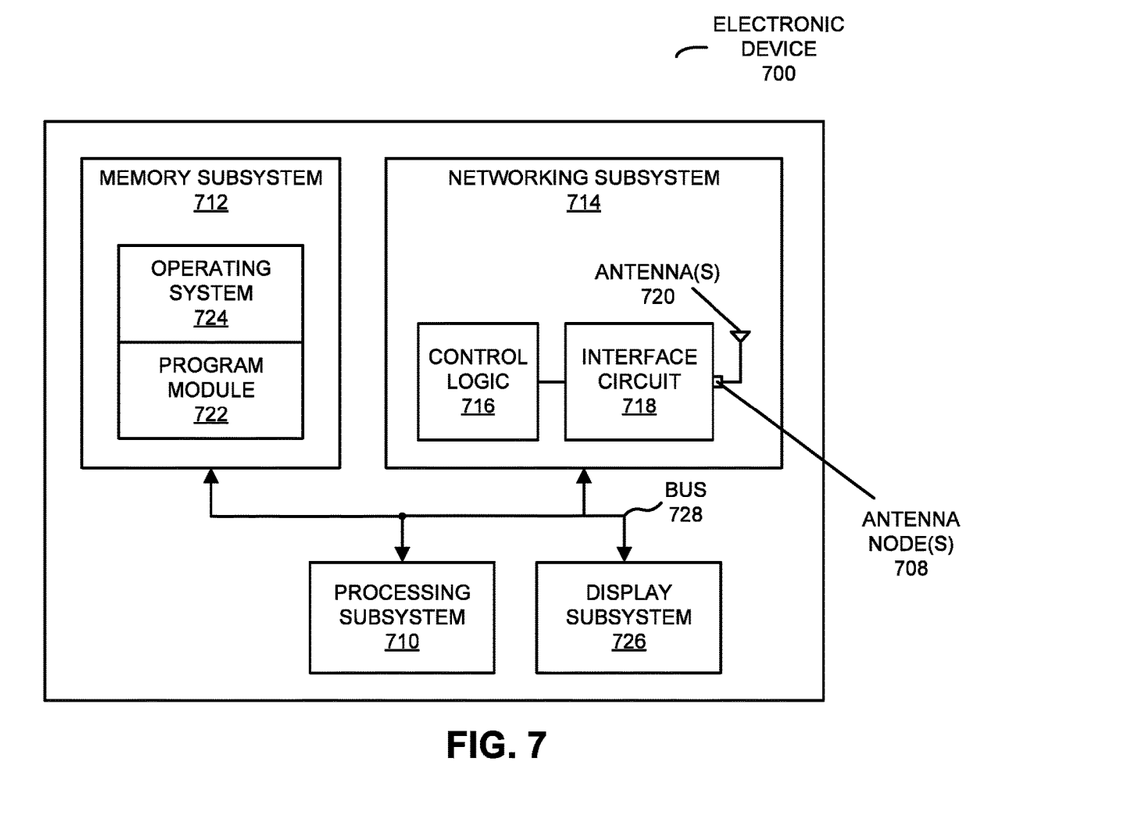
FIG. 7 is a block diagram illustrating an electronic device in accordance with an embodiment of the present disclosure.

As described further below with reference to FIG. 7, radio node 110, electronic device 112 and access point 114 may include subsystems, such as a networking subsystem, a memory subsystem and a processor subsystem. In addition, radio node 110, electronic device 112 and access point 114 may include radios 126 in the networking subsystems. More generally, radio node 110, electronic device 112 and access point 114 can include (or can be included within) any electronic devices with the networking subsystems that enable radio node 110, electronic device 112 and access point 114 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security, Wi-Fi Protected Access), transmit and receive frames that include packets via the connection, etc.

Moreover, as can be seen in FIG. 1, wireless signals 128 (represented by jagged lines) are transmitted by radios 126 in radio node 110, electronic device 112 and/or access point 114. For example, radio 126-3 in access point 114 may transmit information (such as frames that include packets) using wireless signals 128-2. These wireless signals are received by radios 126 in one or more other electronic devices (such as radio 126-2 in electronic device 112). This may allow access point 114 to communicate information to radio node 110 and/or electronic device 112. Note that wireless signals 128-1 may convey LTE frames or packets, and wireless signals 128-2 may convey Wi-Fi frames or packets.

In the described embodiments, processing a frame that includes packets in radio node 110, electronic device 112 and/or access point 114 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

Figure 5:
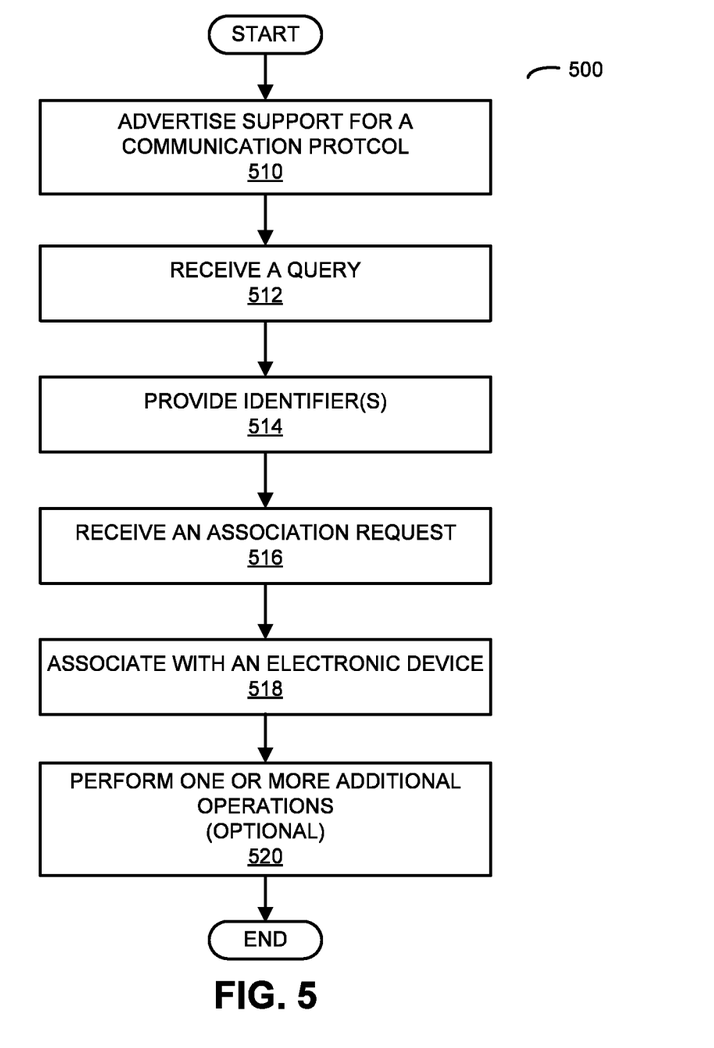
FIG. 5 is a flow diagram illustrating a method for establishing communication with an electronic device and a cellular-telephone network in accordance with an embodiment of the present disclosure.
Figure 6:
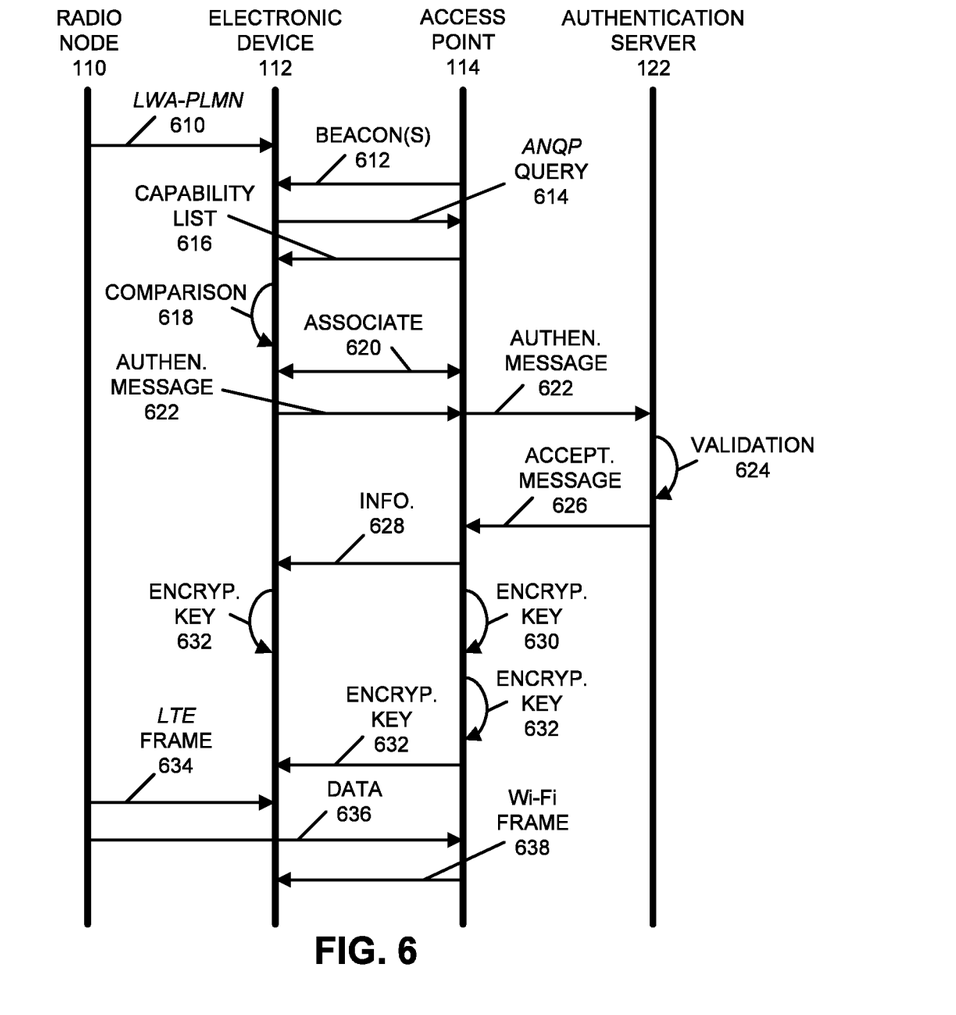
FIG. 6 is a drawing illustrating communication among the electronic devices in FIG. 1 in accordance with an embodiment of the present disclosure.

We now describe embodiments of a method. FIG. 5 presents a flow diagram illustrating a method 500 for establishing communication with an electronic device and a cellular-telephone network according to some embodiments. This method may be performed by an access point (or a WLC), such as access point 114 (FIG. 1). During operation, the access point advertises support for a communication protocol (operation 510) in beacons and/or probe responses. For example, the communication protocol may include: a Hotspot 2.0 protocol, and/or one or more LWA protocols.

Then, the access point receives, from the electronic device, a query (operation 512) for identifiers of one or more cellular-telephone networks supported by the access point. For example, the query may be compatible with an ANQP and the identifiers may include PLMN identifiers.

Moreover, in response to the query the access point provides, to the electronic device, the identifiers (operation 514) of the one or more cellular-telephone networks that provide communication via one or more LWA protocols, and which are supported by the access point.

Next, the access point receives, from the electronic device, an association request (operation 516), and associates with the electronic device (operation 518) in response to the association request.

In some embodiments, the access point optionally performs one or more additional operations (operation 520). For example, the access point may receive, from the electronic device, an authentication request with credentials of the electronic device with the cellular-telephone network, and the access point may forward the authentication request to a server associated with the cellular-telephone network. In particular, the access point may communicate the authentication request with the server via a RADIUS protocol. Additionally, the access point may receive, from the server, an acceptance message that includes information used to generate encryption keys for an IEEE 802.11 session between the access point and the electronic device. The access point may provide this information to the electronic device and/or may use the information to generate an encryption key for use by the access point during the IEEE 802.11 session. Alternatively or additionally, the access point may assist the radio node in performing load or traffic balancing with the electronic device. In particular, the access point may receive, from the radio node, LTE PDCP datagrams that are encapsulated into IEEE 802.11 MAC frames. Then, the access point may communicate the IEEE 802.11 MAC frames to the electronic device. Note that the load balancing may involve LWA protocols such as: transport protocols (e.g., GTP-U over UDP) and/or Xw-AP over SCTP), a control protocol, a management protocol, and/or user traffic over these transports.

In some embodiments of method 500, there may be additional or fewer operations. Moreover, the order of the operations may be changed, and/or two or more operations may be combined into a single operation.

Embodiments of the communication technique are further illustrated in FIG. 5, which presents a drawing illustrating communication between radio node 110, electronic device 112, access point 114 and authentication server 122 according to some embodiments. In particular, during the LTE registration, radio node 110 may provision LWA_PLMN 610 element value of a cellular-telephone network to electronic device 112.

Subsequently, access point 114 may broadcast beacons 612 that include or advertise support for a communication protocol, such as Hotspot 2.0 and/or one or more LWA protocols. In response, electronic device 112 may send an ANQP query 614 for the LWA_PLMN element(s) supported on access point 114. Then, access point 114 may send, via ANQP, a capability list 616 with the supported LWA_PLMN element(s).

Electronic device 112 may compare 618 the pre-provisioned LWA_PLMN 610 element value with the LWA_PLMN element(s) returned by access point 114. If there is a match between the LWA_PLMN element values, electronic device 112 may associate 620 with access point 114. Alternatively, if the LWA_PLMN element values do not match, electronic device 112 may not associate.

Then, electronic device 112 may attempt to authenticate using IEEE 802.11x using its cellular credential in an authentication message 622. In response, access point 114 may forward authentication message 622 to authentication server 122 using a RADIUS protocol over a wired (such as Ethernet) and/or a wireless connection.

Authentication server 122 may perform validation 624 of the cellular credential of electronic device 112. If the authentication is successful, an acceptance message 626 may be returned via RADIUS to access point 114 along with information 628 used to generate dynamic encryption keys for the Wi-Fi session between electronic device 112 and access point 114. In response, access point 114 may provide information 628 to electronic device 112 and/or may use information 628 to generate an encryption key 630 for use by access point 114 during the Wi-Fi session. In some embodiments, access point 114 uses information 628 to generate an encryption key 632 for use by electronic device 112, which access point 114 provides to electronic device 112. Otherwise, electronic device 112 may use information 628 to generate encryption key 632.

Furthermore, subsequently radio node 110 may communicate LTE frames 634 with electronic device 112, and may perform load or traffic balancing by communicating data 636 to access point 114, which then communicates Wi-Fi frames 638 that include data 636 to electronic device 112.

We now describe embodiments of an electronic device, such as radio node 110, electronic device 112 and/or access point 114 in FIG. 1 that performs at least some of the operations in the communication technique. FIG. 7 presents a block diagram illustrating an electronic device 700 in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, application-specific integrated circuits (ASICs), microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program module 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more antenna nodes, such as nodes 708, e.g., a pad, which can be coupled to the one or more antennas 720. Thus, electronic device 700 may or may not include the one or more antennas 720.) For example, networking subsystem 714 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a consumer-electronic device, a portable computing device, an access point, a transceiver, a router, a switch, communication equipment, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and LTE communication protocols as illustrative examples, in other embodiments a wide variety of cellular-telephone communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 722, operating system 724 (such as a driver for interface circuit 718) or in firmware in interface circuit 718. Alternatively or additionally, at least some of the operations in the communication technique may be implemented in a physical layer, such as hardware in interface circuit 718.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
   one or more antenna nodes configured to couple to an antenna; and
   an interface circuit, coupled to the one or more antenna nodes, configured to communicate with an electronic device and a radio node in a cellular-telephone network, wherein the interface circuit is configured to:
      advertise support in beacons for a communication protocol and for one or more cellular-telephone-network data communication Wi-Fi aggregation protocols;
      receive a query, associated with the electronic device, for identifiers of one or more cellular-telephone networks, one or more networks that are hosted by one or more entities that are other than a cellular-telephone provider, or both that provide communication via the one or more cellular-telephone-network data communication Wi-Fi aggregation protocols, and which are supported by the access point;
      provide, addressed to the electronic device, the identifiers of the one or more cellular-telephone networks, the one or more networks that are hosted by the one or more entities that are other than the cellular-telephone provider, or both in response to the query;
      receive an association request, which is associated with the electronic device; and
      associate with the electronic device in response to the association request.

2. The access point of claim 1, wherein the communication protocol comprises a Hotspot 2.0 protocol.

3. The access point of claim 1, wherein the identifiers of the cellular telephone networks comprise public land mobile network (PLMN) identifiers.

4. The access point of claim 1, wherein the query is compatible with an access network query protocol (ANQP).

5. The access point of claim 1, wherein the access point advertises support for the communication protocol in probe responses.

6. The access point of claim 1, wherein the access point is configured to assist the radio node in performing traffic balancing with the electronic device via the one or more cellular-telephone-network data communication Wi-Fi aggregation protocols.

7. The access point of claim 6, wherein, during the traffic balancing, the interface circuit is configured to:
   receive cellular-telephone-network packet data convergence protocol (PDCP) datagrams, associated with the radio node, that are encapsulated into IEEE 802.11 media access control (MAC) frames; and
   communicate the IEEE 802.11 MAC frames for the electronic device.

8. A non-transitory computer-readable storage medium for use in conjunction with an access point, the computer-readable storage medium storing program instructions, wherein, when executed by the access point, the program instructions cause the access point to establish communication among the access point, an electronic device, and a radio node in a cellular-telephone network by performing operations comprising:

advertising support in beacons for a communication protocol and for one or more cellular-telephone-network data communication Wi-Fi aggregation protocols;

receiving a query, associated with the electronic device, for identifiers of one or more cellular-telephone networks, one or more networks that are hosted by one or more entities that are other than a cellular-telephone provider, or both that provide communication via the one or more cellular-telephone-network data communication Wi-Fi aggregation protocols, and which are supported by the access point;

providing, addressed to the electronic device, the identifiers of the one or more cellular-telephone networks, the one or more networks that are hosted by the one or more entities that are other than the cellular-telephone provider, or both in response to the query;

receiving an association request, which is associated with the electronic device; and associating with the electronic device in response to the association request.

9. The computer-readable storage medium of claim 8, wherein the communication protocol comprises a Hotspot 2.0 protocol.

10. The computer-readable storage medium of claim 8, wherein the identifiers of the cellular telephone networks comprise public land mobile network (PLMN) identifiers.

11. The computer-readable storage medium of claim 8, wherein the query is compatible with an access network query protocol (ANQP).

12. The computer-readable storage medium of claim 8, wherein the access point advertises support for the communication protocol in probe responses.

13. The computer-readable storage medium of claim 8, wherein the operations comprise assisting the radio node in performing traffic balancing with the electronic device via the one or more cellular-telephone-network data communication Wi-Fi aggregation protocols.

14. The computer-readable storage medium of claim 13, wherein assisting the radio node in performing traffic balancing involves:

receiving cellular-telephone-network packet data convergence protocol (PDCP) datagrams, associated with the radio node, that are encapsulated into IEEE 802.11 media access control (MAC) frames; and communicating the IEEE 802.11 MAC frames for the electronic device.

15. A method for establishing communication among an access point, an electronic device, and a radio node in a cellular-telephone network, wherein the method comprises:

by an access point:

advertising support in beacons for a communication protocol and for one or more cellular-telephone-network data communication Wi-Fi aggregation protocols;

receiving a query, associated with the electronic device, for identifiers of one or more cellular-telephone networks, one or more networks that are hosted by one or more entities that are other than a cellular-telephone provider, or both that provide communication via the one or more cellular-telephone-network data communication Wi-Fi aggregation protocols, and which are supported by the access point;

providing, addressed to the electronic device, the identifiers of the one or more cellular-telephone networks, the one or more networks that are hosted by the one or more entities that are other than the cellular-telephone provider, or both in response to the query;

receiving an association request, which is associated with the electronic device; and associating with the electronic device in response to the association request.

16. The method of claim 15, wherein the communication protocol comprises a Hotspot 2.0 protocol.

17. The method of claim 15, wherein the identifiers of the cellular telephone networks comprise public land mobile network (PLMN) identifiers.

18. The method of claim 15, wherein the query is compatible with an access network query protocol (ANQP).

19. The method of claim 15, wherein the access point advertises support for the communication protocol in probe responses.

20. The method of claim 15, wherein the method comprises assisting the radio node in performing traffic balancing with the electronic device via the one or more cellular-telephone-network data communication Wi-Fi aggregation protocols.

* * * * *

UNITED STATES PATENT AND TRADEMARK OFFICE
CERTIFICATE OF CORRECTION

Page 1 of 1

PATENT NO. : 10,805,867 B2
APPLICATION NO. : 15/750505
DATED : October 13, 2020
INVENTOR(S) : Martin et al.

It is certified that error appears in the above-identified patent and that said Letters Patent is hereby corrected as shown below:

On the Title Page

Item (71) Applicant: Please correct "Ruckus Wireless, Inc., Sunnyvale, CA" to read -- ARRIS Enterprises LLC, Suwanee, GA --

Item (74) Attorney, Agent, or Firm: Please correct "Stewart Wipner" to read -- Stewart Wiener --

Signed and Sealed this
Ninth Day of March, 2021

Drew Hirshfeld
*Performing the Functions and Duties of the
Under Secretary of Commerce for Intellectual Property and
Director of the United States Patent and Trademark Office*